Patented Sept. 23, 1941

2,256,920

UNITED STATES PATENT OFFICE 2,256,920

ANIMAL GLANDULAR PRODUCT AND PROCESS OF PRODUCING THE SAME

William D. Allers, Oak Park, Ill., assignor to Armour and Company, Chicago, Ill., a corporation of Illinois No Drawing. Application October 19, 1938, Serial No. 235,865

6 Claims. (Cl. 167—74)

This invention relates to animal glandular products and processes of producing the same.

Animal glandular materials such as adrenals, ovaries, and the like, are sources of physiologically active substances used in medicines. Such active materials are obtained from the glands by extraction methods well known to the art. However, it is customary, in fact necessary, to extract the glands as soon as possible after the animal has been slaughtered. In other words, fresh glands must be used because of the rapidity with which the physiologically active substances are destroyed on prolonged storage of the gland. It is not unusual to freeze the animal glands right after slaughter and thus preserve them for short periods of time, a few hours or days at the most.

Destruction of the physiologically active materials is in part brought about by the presence of large quantities of water in the gland. Although the glands can be dried, serious loss and inactivation of the active substances therein is met with. The heat and time necessary to evaporate the water, even under vacuum, is enough to effect changes in the activity of the active substances. The moisture in the gland is necessary for inactivation to take place, but the destruction of the active substances is a complex phenomenon not thoroughly understood. Whatever causes the destruction, it is a fact that water is the medium in which the inactivation reaction occurs.

Hitherto, no one has been able to process fresh glands so that the processed material could be stored at room temperature, about 20° C. or shipped, and thus prolong the elapsed time between slaughter of the animal and extraction of the gland for recovery of the active principles. And such a process would be desirable for obvious reasons. Recovery of the active principles need not be immediate after slaughter. The glands could be stored and extracted at leisure. Such a process must, however, insure that the processed, or "preserved" gland, retains its content of active principles.

It have now discovered ways by which animal glandular material can be preserved over long periods of time, at ordinary room temperature, generally as long as four months, without substantial loss of active principles therein. My invention is based on the discovery that certain inorganic salts, when admixed with the minced fresh glands, act to "dehydrate" the gland. This action is not, however, an absorption of tissue water by anhydrous salts taking up water of crystallization. When the salts of the present process are admixed with the gland the salts function to break the colloidal system comprising proteins swollen in tissue juice. After addition of the salt used, and a short standing period, the mixture can be pressed to squeeze out water (really a saturated salt solution) and give a relatively water-free mixture of glandular material or this moist residue can be dried in pans, if desirable in a wind tunnel at ordinary temperatures, to give a dry mixture, which contains the active principles, and which can be treated for the recovery thereof at leisure.

The action of the salts is specific. After testing many different inorganic salts, I have discovered only a few which are operative to break the protein colloid system and release bound water without destruction of the active principles, and in such fashion that the active principles remain in the water-freed protein residue. This is important. If the active principles were released from the confines of the tissue cells and thus transferred to the tissue juice, the advantages of my process would be completely lost. The active principles must be retained in protein residue so that it can be stored, shipped, and extracted when convenient.

Of the many inorganic salts tested, ammonium sulfate gives superior results. But aluminum sulfate, aluminum ammonium sulfate, aluminum potassium sulfate, and sodium hydrogen sulfate work nearly as well. Anhydrous sodium sulfate is not satisfactory, although it has been used to "dry up" wet glands by its action of picking up water of crystallization from the gland. The result in that case is not a dehydrated gland for the water is still there, although bound to the sodium sulfate. In my process, as stated, the salt performs an entirely different function from merely taking up the gland moisture. It functions to release it in a way in which it can actually be pressed out of the tissue, leaving protein cells and active principles behind.

The following examples will illustrate how my invention can be practised.

Four parts by weight of fresh minced beef adrenals are mixed with two parts by weight of ammonium sulfate and the mixture allowed to stand over-night. It is then pressed and about two and a half to three parts of a clear colorless fluid pressed out. This fluid consists essentially of the natural tissue water saturated with ammonium sulfate. The pressed residue is then dried in the air. When assayed immediately after drying, and after four months storage, for cortical hormone content the dried material shows about the same activity, there being only slight loss on storage after three months. Activity in both the stored and immediately assayed material is practically as high as that in fresh untreated glands.

Instead of using ammonium sulfate I can use any of the four other salts mentioned above as operative.

In another example, forty-five parts of hog ovaries are admixed and minced with thirty-four parts of ammonium sulfate and the mixture allowed to stand over-night. It is then pressed and the pressed juice discarded. The residue tests for progesterone.

In another example, four parts by weight of beef adrenals are minced with three parts by weight of aluminum ammonium sulfate. After standing and pressing, a press juice amounting to about two and a half parts by weight is obtained. The solid residue has as much epinephrine and cortical hormone content as the original gland.

Although I have only described specifically the treatment of adrenals and ovaries, my process can be used with many other glands, such as pituitaries, testicles, brain tissue, thymus, and other glands. Since the action is one of syneresis, and all these tissues are water-swollen proteins, it is apparent that the particular salts enumerated as operative will be operative with all of the common animal glands usually extracted for the recovery of physiologically active materials.

All of the salts I use are sulfates but, as indicated, within the broad class of inorganic sulfates I have found only a limited few which are operative.

The pressed solid residue can be extracted at once to recover active principles, or it can be dried and stored and then extracted. Either way gives essentially the same result. Extraction methods commonly used on fresh glands are used on my glandular product.

Having thus described my invention, what I claim is:

1. The process of treating animal glandular material which comprises admixing the glandular material in substantially its normal wet state with an inorganic sulfate chosen from the group consisting of ammonium sulfate, ammonium aluminum sulfate, aluminum potassium sulfate, aluminum sulfate and sodium hydrogen sulfate, allowing the mixture to stand to effect syneresis, and pressing the mixture.

2. The process of treating animal glandular material which comprises admixing the glandular material in substantially its normal wet state with an inorganic sulfate chosen from the group consisting of ammonium sulfate, ammonium aluminum sulfate, aluminum potassium sulfate, aluminum sulfate and sodium hydrogen sulfate, allowing the mixture to stand to effect syneresis, pressing the mixture to free it of tissue juices, and drying the solid residue.

3. The process as in claim 1 wherein the glandular material is beef adrenals.

4. The process as in claim 2 wherein the glandular material is beef adrenals.

5. The process as in claim 1 wherein the glandular material is ovaries.

6. The process as in claim 2 wherein the glandular material is ovaries.

WILLIAM D. ALLERS.